United States Patent
Ide

[11] Patent Number: 6,144,443
[45] Date of Patent: Nov. 7, 2000

[54] APPARATUS AND METHOD FOR MEASURING CRYSTAL LATTICE STRAIN

[75] Inventor: Takashi Ide, Tokyo, Japan

[73] Assignee: NEC Corporation, Tokyo, Japan

[21] Appl. No.: 09/382,020

[22] Filed: Aug. 24, 1999

[30] Foreign Application Priority Data

Aug. 25, 1998 [JP] Japan .................................. 10-238863

[51] Int. Cl.[7] .................................................. G01N 21/00
[52] U.S. Cl. ................................................ 356/30; 356/32
[58] Field of Search ................................ 356/30, 31, 32, 356/354, 443, 444

[56] References Cited

U.S. PATENT DOCUMENTS

| 5,011,278 | 4/1991 | Farrell .................................... 356/28 |
| 5,453,617 | 9/1995 | Tsuneta et al. ......................... 250/311 |

FOREIGN PATENT DOCUMENTS

| 0 168 838 A2 | 7/1985 | European Pat. Off. . |
| 0 630 040 A1 | 6/1994 | European Pat. Off. . |
| 0 727 660 A2 | 2/1996 | European Pat. Off. . |
| 59-55030 | 3/1984 | Japan . |
| 61-134646 | 6/1986 | Japan . |
| 61-218929 | 9/1986 | Japan . |
| 3-18744 | 1/1991 | Japan . |

OTHER PUBLICATIONS

Snoeck, E. et al, Quantitative analysis of strain field in thin films from HRTEM micrographs, Thin Solid Films 319 (1998) 157–162.

Ide, T. et al., Nanometer–Scale Imaging of Lattice Deformation with Transmission Electron Micrograph, JP J. Appl. Phys. vol. 37 (1998) pp. L1546–L1548.

*Primary Examiner*—Richard A. Rosenberger
*Attorney, Agent, or Firm*—Hutchins, Wheeler & Dittmar

[57] ABSTRACT

An apparatus for measuring crystal strain in a microscopic region within a semiconductor crystal. The apparatus comprises: a He—Ne laser 1 for irradiating a laser light perpendicularly to the recording surface of a negative film 2 on which a transmission electron microscope image of a semiconductor crystal as a sample is recorded; a translucent screen 3 on which a diffraction image is projected, said diffraction image being produced by transmitting the laser light through said transmission electron microscope image recorded on said negative film 2; a CCD camera 4 for taking said diffraction image projected; and a computer for measurement and control 5 for scanning irradiation positions of said laser light, for taking in picked up image data from said CCD camera 4 in synchronization with said scanning, for measuring positions or intensities of diffraction spots based on said picked up image data, and for mapping a relation of diffraction spot positions or diffraction spot intensities for each irradiation position.

17 Claims, 6 Drawing Sheets

APPARATUS AND METHOD FOR MEASURING CRYSTAL LATTICE STRAIN

FIELD OF THE INVENTION

The present invention relates to a method and an apparatus for measuring crystal lattice strain or deformation (defect) resulting from a stress exerted in a microscopic area, for example, within a crystal of semiconductor.

BACKGROUND OF THE INVENTION

Conventionally, a technique of using X-ray diffraction is established, as a technique of measuring crystal lattice strain. As the technique of using X-ray diffraction, there is known a method of measuring crystal strain which utilizes a fact that a width of a diffraction line of X-ray diffraction obtained by irradiating X-ray to a semiconductor crystal as a sample broadens due to crystal strain, a method of obtaining a map of whole sample by irradiating X-ray to the sample and recording Bragg reflected ray from the sample, and other methods.

Also, there is known the micro Raman method, as a technique of measuring strain of microscopic portion of a crystal. As an example, Japanese patent laid-open publication No. 3-18744 discloses a method of measuring strain of a microscopic portion of a crystal using a laser Raman spectroscopy method. In this measuring method using the laser Raman spectroscopy method, a slit is formed at a thin film formed on a semiconductor substrate and thereby a portion of the semiconductor substrate is exposed. A laser light is then irradiated on the exposed surface of the semiconductor substrate, and crystal strain is measured from the spectroscopy spectrum of a reflected light thereof.

As another method of measuring strain of a microscopic portion of a crystal, there is also known a method using convergence-beam electron diffraction.

However, as semiconductor elements formed using a semiconductor crystal are highly integrated and size of each element becomes small, strain of crystal resulting from a stress exerted on a microscopic region within a semiconductor crystal becomes a problem. In the technique using X-ray diffraction, it is difficult to narrow down a spot of irradiated X-ray into a size equal to or smaller than several micrometers and, therefore, it was substantially impossible to measure the above-mentioned crystal strain resulting from a stress exerted on a microscopic region within a semiconductor crystal.

In the technique using the micro Raman method, it is possible to obtain a spatial resolution higher than that of the technique using X-ray diffraction. However, even in this technique, it was impossible to obtain a resolution sufficient to measure the above-mentioned crystal strain resulting from a stress exerted on a microscopic region within a semiconductor crystal.

Also, in the method using convergence-beam electron diffraction, it is possible to narrow down a diameter of an electron beam to, for example, 1 nm and thereby to measure strain of a microscopic portion of a crystal. However, when a distribution of crystal lattice strain throughout a sample is to be inspected, it is necessary to measure electron diffraction patterns over thousands of portions, and, therefore, enormous labor and time are required.

SUMMARY OF THE INVENTION

It is an object of the present invention to provide an apparatus for measuring crystal strain and a method for measuring crystal strain, by which a crystal strain resulting from a stress exerted on a microscopic region within a semiconductor crystal can be measured.

It is another object of the present invention to provide an apparatus for measuring crystal strain and a method for measuring crystal strain, by which a distribution of crystal lattice strain over a wide area of a sample can be easily measured.

According to an aspect of the present invention, there is provided an apparatus for measuring crystal strain comprising: a film fixture means to which a negative film having a recording surface on that a transmission electron microscope image of a semiconductor crystal as a sample is recorded is attached, and which is translatable parallel to the recording surface of the negative film; a laser light source provided to irradiate a laser light to the recording surface of the negative film perpendicularly to the recording surface of the negative film; a translucent screen on which a diffraction image is projected, the diffraction image being produced by irradiating the laser light outputted from said laser light source to the transmission electron microscope image recorded on the recording surface of the negative film; an image pick up means for taking the diffraction image projected on the translucent screen; and a measurement and control means for translating and controlling the film fixture means to scan irradiation positions of the laser light on the recording surface of the negative film, for taking in picked up image data from the image pick up means in synchronization with the scanning, for measuring positions or intensities of diffraction spots of the diffraction image based on the picked up image data, and for mapping information obtained from measurement of diffraction spot positions or diffraction spot intensities for each irradiation position.

According to another aspect of the present invention, there is provided a method of measuring crystal strain comprising: recording a transmission electron microscope image of a semiconductor crystal as a sample on a recording surface of a negative film; irradiating a laser light onto the recording surface of the negative film perpendicularly to the recording surface; projecting a diffraction image produced by the scattering of the laser light in the transmission electron microscope image recorded on the recording surface of the negative film onto a translucent screen; measuring positions or intensities of diffraction spots of the diffraction image projected; and performing the measuring at a plurality of irradiating position of the laser light on the recording surface and mapping information obtained from measurement of diffraction spot positions or diffraction spot intensities for each position of laser irradiation.

In the present invention having structures mentioned above, a strain of a semiconductor crystal is measured based on a diffraction image obtained by irradiating a laser light on a transmission electron microscopic image recorded on a negative film. In this method, it is possible to raise spatial resolution by decreasing a diameter of a spot of the laser light irradiated on the negative film, and thus it is possible to obtain a spatial resolution higher than that obtained when observing only by using a transmission electron microscope. Therefore, according to the present invention, it becomes possible to measure a crystal strain resulting from a stress exerted on a microscopic region within a semiconductor crystal, which was impossible to measure until now. Also, according to the present invention, a distribution of crystal lattice strain can be obtained easily and in a short time.

BRIEF DESCRIPTION OF THE DRAWINGS

These and other features, and advantages, of the present invention will be more clearly understood from the following detailed description taken in conjunction with the accompanying drawings, in which like reference numerals designate identical or corresponding parts throughout the figures, and in which.

DESCRIPTION OF A PREFERRED EMBODIMENT

With reference to the drawings, embodiments of the present invention will now be described.

(Embodiment 1)

Figure 1A:
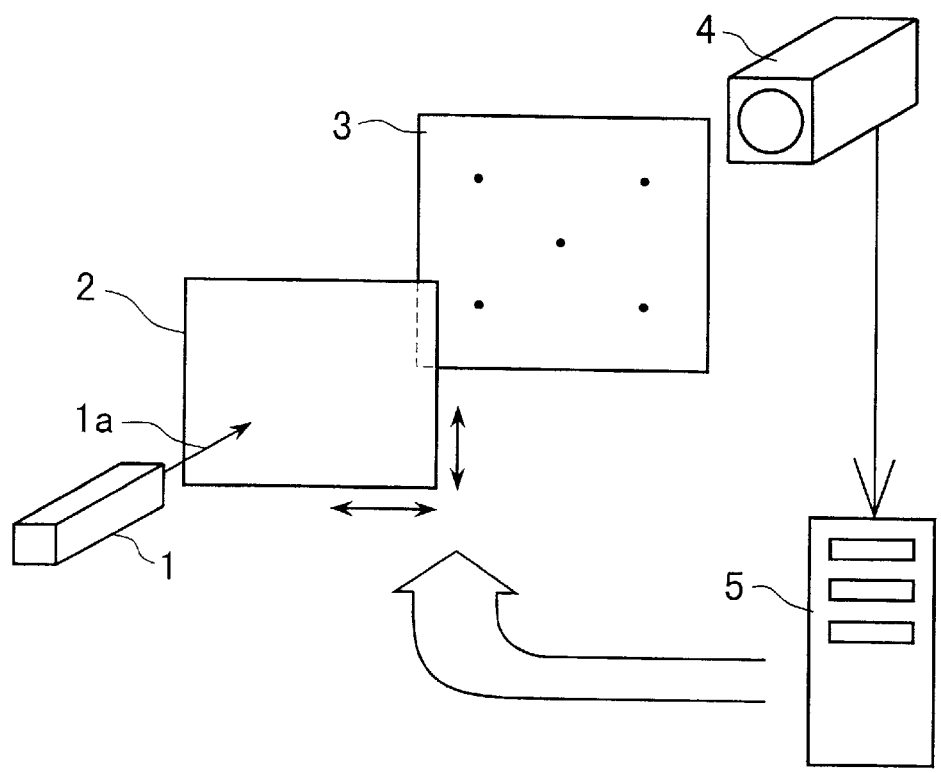
FIG. 1A is a perspective and schematic view showing an outline of an apparatus for measuring crystal strain according to a first embodiment of the present invention.
Figure 1B:
FIG. 1B is a schematic plan view showing an outline of an apparatus for measuring crystal strain of FIG. 1A.
Figure 1B:
Figure 1B:
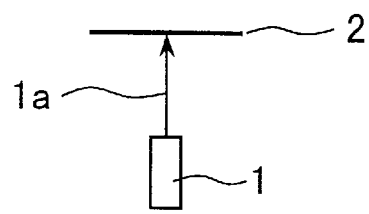

FIG. 1A is a perspective view illustrating a schematic structure of an apparatus for measuring crystal strain according to a first embodiment of the present invention, and FIG. 1B is a plan view thereof.

In FIG. 1, a negative film 2 is a negative film on which a transmission electron microscope image of a semiconductor crystal as a sample is recorded, the transmission image being an image enlarged and observed by using a transmission electron microscope. The negative film 2 is attached to a film fixture or holder (not shown in the drawing). The film fixture can translate the negative film 2 in parallel to the plane of the film.

A He—Ne laser 1 is disposed such that a laser beam or laser light 1a therefrom is irradiated on the recording surface of the negative film 2 attached to the film fixture, perpendicularly to the recording surface of the negative film 2. A diffraction image produced by the transmission of the laser light 1a from the He—Ne laser 1 through the electron microscope image recorded on the negative film 2 is projected on a translucent plane screen 3.

A CCD camera 4 takes or picks up an image of the diffraction image projected on the translucent plane screen 3. An image data picked up by the CCD camera 4 is outputted to a computer 5 for measurement and control. It is preferable that the CCD camera used is a high definition type camera (a camera having a large number of pixels).

The computer for measurement and control 5 performs control and translation of the film fixture and scans a position of irradiation of the laser beam or light 1a on the recording surface of the negative film 2. The computer 5 also accepts the picked up image data from the CCD camera 4 in synchronism with such scanning, measures a position of each diffraction spot in the diffraction image based on the picked up image data and performs mapping of a relation of the position of each diffraction spot with respect to the position of irradiation.

Next, description will be made on a measurement procedure of crystal strain in this apparatus for measuring crystal strain.

As a preparation step, a semiconductor crystal (a slice) having a predetermined thickness is prepared as a sample. A transmission electron microscope image of the semiconductor crystal is recorded on a photographic film by using a transmission electron microscope and the photographic film is developed to fabricate a negative film 2. The negative film thus fabricated is attached to the film fixture of the apparatus for measuring crystal strain and a measurement of crystal strain is performed.

In the measurement of crystal strain, the computer for measurement and control 5 controls the film fixture, and moves an irradiation point of laser light to a first measurement point on the recording surface of the negative film 2. After the irradiation point of laser light has come to the first measurement point, a laser light 1a is irradiated from the He—Ne laser 1. The irradiated laser light transmits the negative film 2 and is scattered by the electron microscope image recorded on the negative film 2 so that a diffraction image is produced. This diffraction image is projected on the translucent plane screen 3, and the projected image is picked up by the CCD camera 4. The computer for measurement and control 5 receives an image data picked up by the CCD camera 4, and measures a position of each diffraction spot of the diffraction image.

Subsequently, the computer for measurement and control 5 controls the film fixture, and moves an irradiation position of the laser beam to the next measuring point on the recording surface of the negative film 2. After the irradiation position of the laser beam is adjusted to the next measuring point, a laser beam 1a is irradiated from the He—Ne laser 1 and diffraction image is projected on the translucent plane screen 3. The projected diffraction image is picked up by the CCD camera 4. In a manner similar to that mentioned above, the computer for measurement and control 5 measures a position of each diffraction spot of the diffraction image based on the image data picked up by the CCD camera 4.

Similarly, the computer for measurement and control 5 scans the irradiation position of the laser beam on the recording surface of the negative film 2, measures positions of diffraction spots of a diffraction image in each of the irradiation position, and performs mapping of a relation of positions of diffraction spots for each of the irradiation positions. Since the positions of the measured diffraction spots reflect a condition of disposal of crystal lattice, it is possible to detect distribution of crystal lattice strain from an information of distribution of mapped diffraction spots.

In order to picturize a distribution of crystal lattice strain by mapping, for example, a recorded plane of the negative film 2 is partitioned into a grid and measures positions of diffraction spots at each intersection of grid lines (for example, each point spaced apart from other points by 1 mm in both vertical and horizontal directions). Measured data is stored in a two-dimensional array having the same size as the number of measuring points. Each data element of the two-dimensional array includes, for example, information concerning diffraction spot positions of each diffraction image or information obtained therefrom. Thereafter, the data stored in a two-dimensional array is picturized and thereby a distribution of crystal lattice strain is picturized.

In the above explanation, positions of diffraction spots with respect to each position of irradiation is mapped and a distribution of crystal lattice strain is picturized. However, when detecting a portion in which crystallinity is deteriorated due to severe strain of crystal (a defective portion), it is often easier to detect such portion by mapping intensities of diffraction spots than by using the above-mentioned method.

When mapping intensities of diffraction spots, the computer for measurement and control 5 measures an intensity of each diffraction spot of a diffraction image in each position of irradiation, while scanning the position of irradiation of the laser beam on the recording plane of the negative film 2. Thereby, a relation of intensities of diffraction spots with respect to each position of irradiation is mapped. In this mapping, it is judged that a portion in which intensity of diffraction spot varies locally is a defective portion.

Since a condition of view of an electron microscope image varies depending on the thickness of a semiconductor crystal as a sample, if the thickness of the semiconductor crystal is not uniform, intensity of diffraction spots varies at a portion where the thickness is not uniform. However, such variation of the intensity of the diffraction spots is not a local variation, but the intensity of the diffraction spots varies over a certain region. Therefore, the variation of the intensity of diffraction spots caused by the difference of the thickness of the semiconductor crystal is not detected as a defective portion.

(Embodiment 2)

Figure 2A:
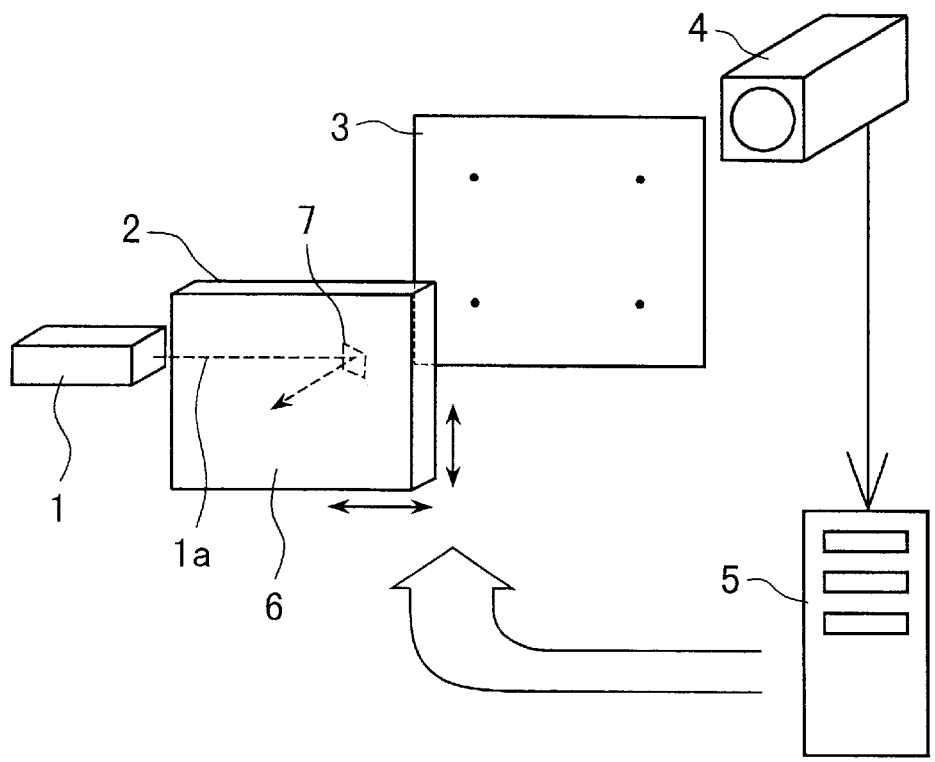
FIG. 2A is a perspective and schematic view showing an outline of an apparatus for measuring crystal strain according to a second embodiment of the present invention.
Figure 2B:
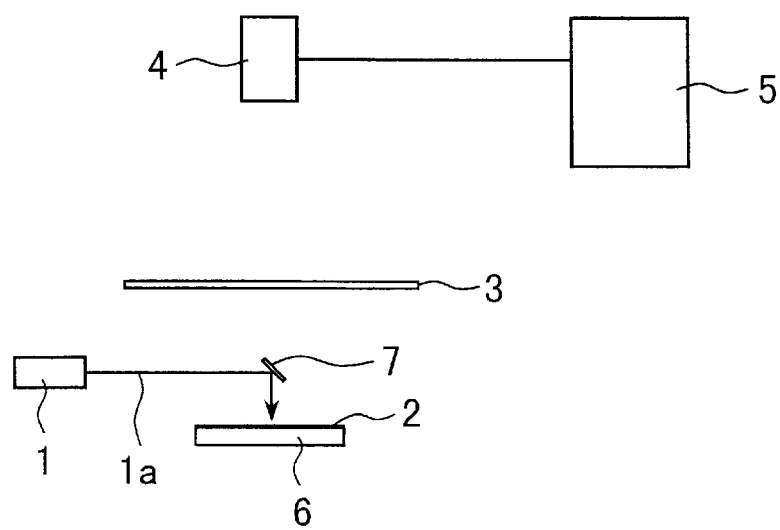
FIG. 2B is a schematic plan view showing an outline of an apparatus for measuring crystal strain of FIG. 2A.

FIG. 2A is a perspective view illustrating a schematic structure of an apparatus for measuring crystal strain according to a second embodiment of the present invention, and FIG. 2B is a plan view thereof. The apparatus for measuring crystal strain according to this embodiment has a structure approximately similar to that of the apparatus according to the first embodiment, except that a film attaching portion 6 and a mirror 7 for reflecting incident light are provided. In FIG. 2, components similar to those of FIG. 1 have the same reference numerals as those of FIG. 1.

The film attaching portion 6 has a mirror surface portion (a metal or semiconductor which is processed to have a mirror surface, or a mirror), and a negative film 2 is attached to the mirror surface portion. The film attaching portion 6 can translate the negative film 2 parallel to the film surface.

The mirror for reflecting incident light 7 is used for guiding a laser beam 1a outputted from the He—Ne laser 1 onto the recording surface of the negative film 2 attached to the film attaching portion 6. The mirror for reflecting incident light 7 is disposed such that the laser beam 1a reflected by the mirror 7 comes onto the recording surface of the negative film 2 attached to the film attaching portion 6 perpendicularly to the recording surface of the negative film 2.

In the apparatus for measuring crystal strain having the structure mentioned above, the laser beam 1a outputted from the He—Ne laser 1 is reflected by the mirror for reflecting incident light 7 and comes onto the recording surface of the negative film 2 attached to the film attaching portion 6 perpendicularly thereto. Then, the irradiated laser beam 1a is reflected by the mirror surface portion of the film attaching portion 6 via the transmission electron microscope image recorded on the negative film 2, and is scattered by the transmission electron microscope image, so that a diffraction image is produced. This diffraction image is projected on the translucent plane screen 3.

In a manner similar to the first embodiment, the computer for measurement and control 5 scans the irradiation position of the laser beam on the recording surface of the negative film 2, measures positions or intensities of diffraction spots of a diffraction image in each of the irradiation positions, and performs mapping of a relation of diffraction spot positions or diffraction spot intensities for each of the irradiation positions.

In this embodiment, since the negative film 2 is attached to the mirror surface portion of the film attaching portion 6, the negative film 2 does not warp. Therefore, it is possible to perform precise positioning of the negative film 2 and to perform precise measurement of crystal strain.

(Embodiment 3)

Figure 3A:
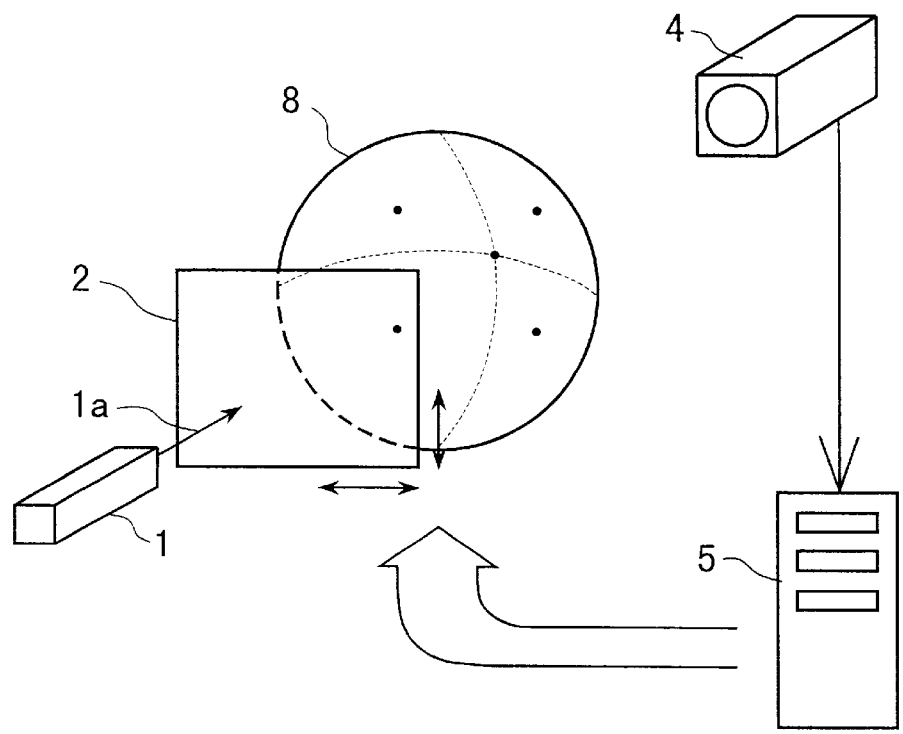
FIG. 3A is a perspective and schematic view showing an outline of an apparatus for measuring crystal strain according to a third embodiment of the present invention.
Figure 3B:
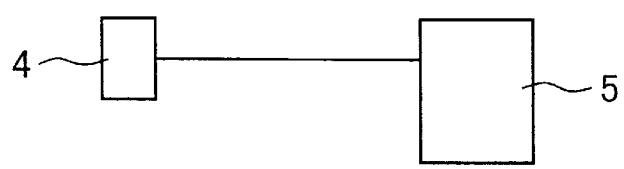
FIG. 3B is a schematic plan view showing an outline of an apparatus for measuring crystal strain of FIG. 3A.
Figure 3B:
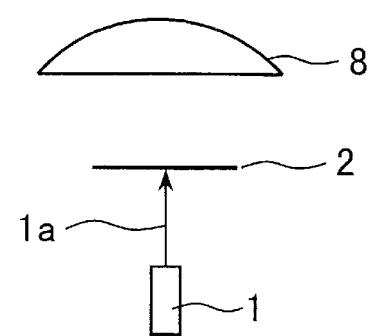

FIG. 3A is a perspective view illustrating a schematic structure of an apparatus for measuring crystal strain according to a third embodiment of the present invention, and FIG. 3B is a plan view thereof. The apparatus for measuring crystal strain according to this embodiment has a structure approximately similar to that of the apparatus according to the first embodiment, except that a translucent semiglobular screen 8 is used in place of the translucent plane screen 3. In FIG. 3, components similar to those of FIG. 1 have the same reference numerals as those of FIG. 1.

In this apparatus for measuring crystal strain, the laser beam 1a irradiated from the He—Ne laser 1 transmits the negative film 2 and is scattered by the electron microscope image recorded on the negative film 2 so that a diffraction image is produced. This diffraction image is projected on the translucent semiglobular screen 8, and the projected image is picked up by the CCD camera 4.

In a manner similar to the first embodiment, the computer for measurement and control 5 scans the irradiation position of the laser beam on the recording surface of the negative film 2, measures positions or intensities of diffraction spots of a diffraction image in each of the irradiation positions, and performs mapping of a relation of diffraction spot positions or diffraction spot intensities for each of the irradiation positions.

(Embodiment 4)

Figure 4A:
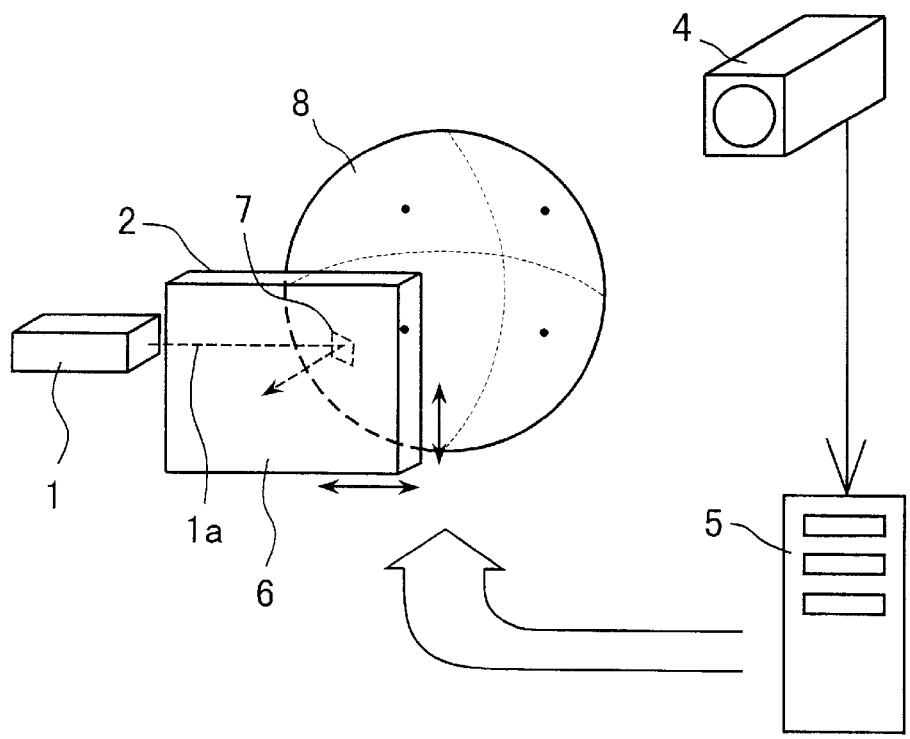
FIG. 4A is a perspective and schematic view showing an outline of an apparatus for measuring crystal strain according to a fourth embodiment of the present invention.
Figure 4B:
FIG. 4B is a schematic plan view showing an outline of an apparatus for measuring crystal strain of FIG. 4A.
Figure 4B:
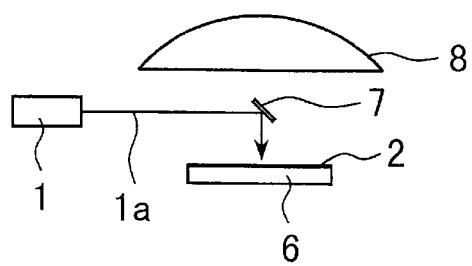

FIG. 4A is a perspective view illustrating a schematic structure of an apparatus for measuring crystal strain according to a fourth embodiment of the present invention, and FIG. 4B is a plan view thereof. The apparatus for measuring crystal strain according to this embodiment has a structure approximately similar to that of the apparatus according to the second embodiment, except that a translucent semiglobular screen 8 is used in place of the translucent plane screen 3. In FIG. 4, components similar to those of FIG. 2 have the same reference numerals as those of FIG. 2.

In the apparatus for measuring crystal strain having the structure mentioned above, the laser beam 1a outputted from the He—Ne laser 1 is reflected by the mirror for reflecting incident light 7 and comes onto the recording surface of the negative film 2 attached to the film attaching portion 6 perpendicularly thereto. Then, the irradiated laser beam 1a is reflected by the mirror surface portion of the film attaching portion 6 via the electron microscope image recorded on the negative film 2, and is scattered by the electron microscope image, so that a diffraction image is produced. This diffraction image is projected on the translucent semiglobular screen 8.

In a manner similar to the second embodiment, the computer for measurement and control 5 scans the irradiation position of the laser beam on the recording surface of the negative film 2, measures positions or intensities of diffraction spots of a diffraction image in each of the irradiation positions, and performs mapping of a relation of diffraction spot positions or diffraction spot intensities for each of the irradiation positions.

(Embodiment 5)

Here, explanation will be made on a method for obtaining a relative spacing of lattice planes and a direction of lattice planes in an electron microscope image, from a diffraction image produced by the electron microscope image recorded on the negative film 2.

Since a diffraction image obtained by X-ray diffraction or electron diffraction is produced by the reflection and interference at the crystal lattice plane, it is possible to obtain information concerning crystal lattice plane (relative spacing of lattice planes and direction of lattice planes) from positions of diffraction spots obtained from the diffraction image. In this embodiment, such technique is utilized.

In the apparatus for measuring crystal strain illustrated in FIG. 3 or FIG. 4, a diffraction image produced by the scattering in the electron microscope image is projected on the translucent semiglobular screen 8. In such structure, a wave number vector equivalent to a wave number vector in the X-ray diffraction or the electron diffraction is easily calculated from image data picked up by the CCD camera 4.

More concretely, the translucent semiglobular screen 8 is disposed such that the center of the translucent semiglobular screen 8 is located on the optical axis of the laser beam incident on the negative film 2 after being reflected by the mirror 7, and also the center of camera lens of the CCD camera 4 is disposed on the optical axis of the laser beam incident on the negative film 2. In this disposition, assuming a coordinate system in which a point on which a direct light or a reflected light from the mirror surface is projected on the translucent semiglobular screen 8, that is a point corresponding to the center of the translucent semiglobular screen 8, is the origin of the diffraction pattern, a coordinate of each diffraction spot (diffraction point) on the image picked up by the CCD camera 4 corresponds to the wave number vector. From this wave number vector, it is possible to obtain relative spacing of crystal lattice planes and direction of crystal lattice planes in the electron microscope image recorded on the negative film 2.

The spacing of crystal lattice planes is inversely proportional to the distance from the origin of the diffraction pattern to the diffraction point corresponding to the crystal lattice plane. By using this relation, variation of the spacing of crystal lattice planes can be inspected relatively, by calculating an inverse number of the distance from the origin of the diffraction pattern to a diffraction point corresponding to each crystal lattice plane.

In the measurement of the spacing of crystal lattice planes, the computer for measuring and control 5 scans the irradiation position of the laser beam on the recording surface of the negative film 2, captures image data at each measurement point, calculates inverse number of the distance from the origin of the diffraction pattern to the diffraction point corresponding to the crystal lattice plane to obtain spacing of crystal lattice planes, and performs mapping of variation of the spacing of lattice planes for each of the irradiation positions. The measurement is performed on condition that, in any measurement point, the center of the camera lens of the CCD camera 4 is located on the straight line which is extended from the position of laser irradiation on the recording plane of the negative film 2 perpendicularly to the recording plane.

Figure 5:
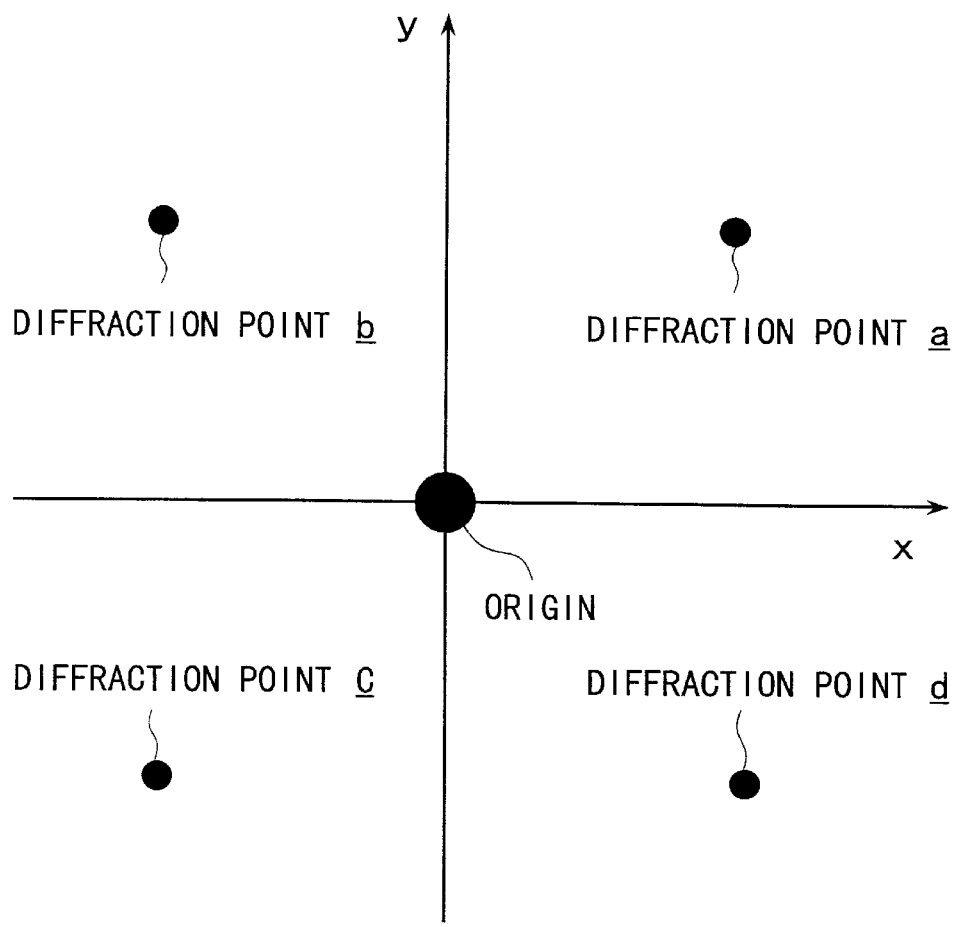
FIG. 5 is a graph showing an example of a coordinate system of a diffraction pattern.

On the other hand, with respect to the direction of crystal lattice plane, a relation is utilized that a direction from the origin of the diffraction pattern toward the diffraction point corresponding to the crystal lattice plane corresponds to the normal line of the crystal lattice plane. For example, as shown in FIG. 5, let the coordinate of a diffraction point be represented as follows.

$(k_x, k_y)$ [Formula 11]

In this case, if $k_x \neq 0$, [Formula 12]

an angle given by $\tan^{-1}(k_y/k_x)-90°$ [Formula 13]

corresponds to an angle of the crystal lattice plane corresponding to the diffraction point with the direction of x-axis. If $k_x=0$, [Formula 14]

the crystal lattice plane corresponding to the diffraction point is parallel to the y-axis. Thus, it is possible to obtain direction of crystal lattice plane.

In the measurement of the direction of crystal lattice plane, the computer for measuring and control 5 scans the irradiation position of the laser beam on the recording surface of the negative film 2, captures image data at each measurement point, measures positions of diffraction spots for each image data, obtains direction of lattice plane based on the positions of the diffraction spots at each irradiation position, and performs mapping of a distribution of direction of lattice plane for each of the irradiation positions. Also, the measurement is performed on condition that, in any measurement point, the center of the camera lens of the CCD camera 4 is located on the straight line which is extended from the position of laser irradiation on the recording plane of the negative film 2 perpendicularly to the recording plane.

(Embodiment 6)

In the above-mentioned embodiment 5, spacing of crystal lattice planes and direction of crystal lattice planes were obtained from a wave number vector. However, it is also possible to obtain a distribution of relative lattice strain or deformation of an electron microscope image from the wave number vector. In this embodiment, a method is described in which a distribution of relative lattice strain is obtained, by obtaining a deformation matrix which is an element of lattice strain from the wave number vector.

When the deformation matrix is to be obtained, a coordinate system shown in FIG. 5 is assumed and, in that coordinate system, let coordinates of two diffraction points which are not in the same direction or are not in the directly opposite direction be represented as follows.

$(k_{1x}, k_{1y})$ and $(k_{2x}, k_{2y})$ [Formula 15]

In this condition, lattice vectors of real space, i.e., $(r_{1x}, r_{1y})$ and $(r_{2x}, r_{2y})$ [Formula 16]

are obtained by the following formulas.

$$r_{1x} = \frac{k_{2y}}{k_{1x}k_{2y} - k_{1y}k_{2x}}, r_{1y} = -\frac{k_{2x}}{k_{1x}k_{2y} - k_{1y}k_{2x}}$$

$$r_{2x} = -\frac{k_{1y}}{k_{1x}k_{2y} - k_{1y}k_{2x}}, r_{2y} = \frac{k_{1x}}{k_{1x}k_{2y} - k_{1y}k_{2x}}$$

[Formula 17]

Here, the two diffraction points which are not in the same direction are those that are not in the relation between two diffraction points, for example, a diffraction point a and a diffraction point on an extension of a line from the origin toward the diffraction point a in the coordinate system in FIG. 5. Also, the two diffraction points which are not in the directly opposite direction are those that are not in the relation between two diffraction points, for example, a diffraction point a and a diffraction point c on an extension of a line from the diffraction point a toward the origin in the coordinate system in FIG. 5.

Then, from lattice vectors obtained as above and average values of these lattice vectors throughout the transmission electron microscope image, i.e., $(r^0_{1x}, r^0_{1y})$ and $(r^0_{2x}, r^0_{2y})$, [Formula 18]

a strain matrix is obtained by the following formula.

$$\begin{pmatrix} 1+\varepsilon_{xx} & \varepsilon_{xy} \\ \varepsilon_{yx} & 1+\varepsilon_{yy} \end{pmatrix} = \begin{pmatrix} r^0_{1x} & r^0_{1y} \\ r^0_{2x} & r^0_{2y} \end{pmatrix}^{-1} \begin{pmatrix} r_{1x} & r_{1y} \\ r_{2x} & r_{2y} \end{pmatrix}$$ [Formula 19]

The strain matrix obtained is represented as follows.

$$\vec{x}' = (1+\epsilon_{xx})\vec{x} + \epsilon_{xy}\vec{y} \quad \vec{y}' = \epsilon_{yx}\vec{x} + (1+\epsilon_{yy})\vec{y}$$ [Formula 20]

Figure 6:
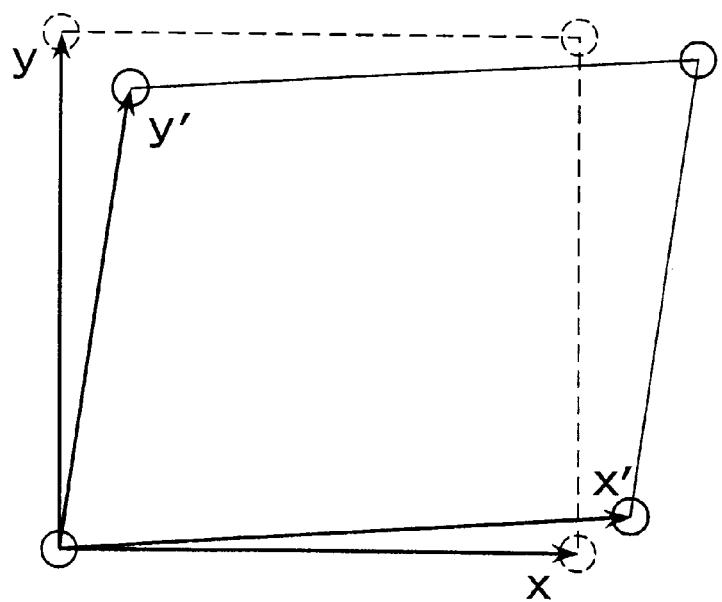
FIG. 6 is a graph illustrating an example of vector variation of x-axis and y-axis due to a deformation of crystal lattice.

This means that, as shown in FIG. 6, a unit vector, i.e., $$\vec{x}$$ [Formula 21]

in the horizontal direction with respect to the surface of the sample semiconductor crystal and a unit vector, i.e., $$\vec{y}$$ [Formula 22]

in the vertical direction with respect to the surface of the sample semiconductor crystal are respectively deformed in the directions, i.e., $$\vec{x} \text{ and } \vec{y}$$ [Formula 23]

by $$\epsilon_{xx}, \epsilon_{xy}, \epsilon_{yx}, \epsilon_{yy},$$ [Formula 24]

when compared with an average lattice of the electron microscope image.

In the above-mentioned measurement of the lattice strain based on the deformation matrix, in the apparatus for measuring crystal strain as shown in FIG. 3 or FIG. 4, the computer for measuring and control 5 scans the irradiation position of the laser beam on the recording surface of the negative film 2, captures image data at each measurement point, obtains the above-mentioned deformation matrix for each image data, and performs mapping of a distribution of lattice strain in each of the irradiation positions based on the deformation matrix. Also, in case of this measurement, the measurement is performed on condition that, in each measurement point, the center of the camera lens of the CCD camera 4 is located on the straight line which is extended from the position of laser irradiation on the recording plane of the negative film 2 perpendicularly to the recording plane.

According to the present invention which is constituted as mentioned above, it is also possible to measure crystal strain resulting from a stress caused in a microscopic area within a semiconductor crystal which was conventionally impossible to measure directly, and it is possible to perform high quality evaluation of a crystal.

According to the present invention, it is also possible to measure a distribution of crystal strain over a wide area of a sample easily and precisely. Therefore, evaluation of a crystal can be performed efficiently and in a relatively short time.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative sense rather than a restrictive sense, and all such modifications are to be included within the scope of the present invention. Therefore, it is intended that this invention encompasses all of the variations and modifications as fall within the scope of the appended claims.

What is claimed is:

1. An apparatus for measuring crystal strain comprising:
   a film fixture means to which a negative film having a recording surface on that a transmission electron microscope image of a semiconductor crystal as a sample is recorded is attached, and which is translatable parallel to said recording surface of said negative film;
   a laser light source provided to irradiate a laser light to said recording surface of said negative film perpendicularly to said recording surface of said negative film;
   a translucent screen on which a diffraction image is projected, said diffraction image being produced by irradiating the laser light outputted from said laser light source to said transmission electron microscope image recorded on said recording surface of said negative film;
   an image pick up means for taking said diffraction image projected on said translucent screen; and
   a measurement and control means for translating and controlling said film fixture means to scan irradiation positions of said laser light on said recording surface of said negative film, for taking in picked up image data from said image pick up means in synchronization with said scanning, for measuring positions or intensities of diffraction spots of said diffraction image based on said picked up image data, and for mapping information obtained from measurement of diffraction spot positions or diffraction spot intensities for each irradiation position.

2. An apparatus for measuring crystal strain as set forth in claim 1, wherein said diffraction image is produced by the transmission of the laser light outputted from said laser light source through said transmission electron microscope image recorded on said recording surface of said negative film.

3. An apparatus for measuring crystal strain as set forth in claim 1, wherein said film fixture means has a mirror surface to which said negative film is attached, and wherein said diffraction image is produced by the reflection of the laser light outputted from said laser light source at said mirror surface of said film fixture means through said transmission electron microscope image recorded on said recording surface of said negative film.

4. An apparatus for measuring crystal strain as set forth in claim 3, wherein said apparatus further comprises a mirror portion disposed on the optical axis of said laser light outputted from said laser light source, and wherein said laser light outputted from said laser light source is reflected by said mirror portion and said laser light reflected by said mirror portion is irradiated perpendicularly onto said recording surface of said negative film.

5. An apparatus for measuring crystal strain as set forth in claim 1, wherein said translucent screen is a plane screen.

6. An apparatus for measuring crystal strain as set forth in claim 1, wherein said translucent screen is a semiglobular screen.

7. An apparatus for measuring crystal strain as set forth in claim 1, wherein said translucent screen is a semiglobular screen, and the center of said semiglobular screen and the center of an image pickup lens of said image pickup means are located on the optical axis of the laser light irradiated perpendicularly onto said recording surface of said negative film.

8. An apparatus for measuring crystal strain as set forth in claim 7, wherein, for each of the image data took in at each irradiation position, said measurement and control means calculates a spacing of crystal lattice planes based on a coordinate of each diffraction spot in a coordinate system in which the center of said semiglobular screen is determined as the origin, and performs mapping of the spacing of crystal lattice planes for each irradiation position.

9. An apparatus for measuring crystal strain as set forth in claim 7, wherein, for each of the image data took in at each irradiation position, said measurement and control means calculates a direction of crystal lattice planes based on a coordinate of each diffraction spot in a coordinate system in which the center of said semiglobular screen is determined as the origin, and performs mapping of the direction of crystal lattice planes for each irradiation position.

10. An apparatus for measuring crystal strain as set forth in claim 7, wherein, for each of the image data took in at each irradiation position, said measurement and control means uses coordinate system wherein the center of said semiglobular screen is determined as the origin, wherein in that coordinate system, coordinates of two diffraction spots which do not exist on the same straight line passing through the origin is represented as follows, $$(k_{1x}, k_{1y}) \text{ and } (k_{2x}, k_{2y}) \qquad \text{[Formula 1]}$$

in this condition, lattice vectors of real space, i.e., $$(r_{1x}, r_{1y}) \text{ and } (r_{2x}, r_{2y}) \qquad \text{[Formula 2]}$$

are obtained by the following formulas, $$r_{1x} = \frac{k_{2y}}{k_{1x}k_{2y} - k_{1y}k_{2x}}, r_{1y} = -\frac{k_{2x}}{k_{1x}k_{2y} - k_{1y}k_{2x}} \qquad \text{[Formula 3]}$$

$$r_{2x} = -\frac{k_{1y}}{k_{1x}k_{2y} - k_{1y}k_{2x}}, r_{2y} = \frac{k_{1x}}{k_{1x}k_{2y} - k_{1y}k_{2x}}$$

from lattice vectors obtained as above and average values of these lattice vectors throughout the transmission electron microscope image recorded on said negative film, i.e., $$(r^0_{1x}, r^0_{1y}) \text{ and } (r^0_{2x}, r^0_{2y}), \qquad \text{[Formula 4]}$$

a deformation matrix is obtained by the following formula, $$\begin{pmatrix} 1+\varepsilon_{xx} & \varepsilon_{xy} \\ \varepsilon_{yx} & 1+\varepsilon_{yy} \end{pmatrix} = \begin{pmatrix} r^0_{1x} & r^0_{1y} \\ r^0_{2x} & r^0_{2y} \end{pmatrix}^{-1} \begin{pmatrix} r_{1x} & r_{1y} \\ r_{2x} & r_{2y} \end{pmatrix} \qquad \text{[Formula 5]}$$

and performs mapping of information obtained from said deformation matrix for each irradiation position.

11. A method of measuring crystal strain comprising:
recording a transmission electron microscope image of a semiconductor crystal as a sample on a recording surface of a negative film;
irradiating a laser light onto said recording surface of said negative film perpendicularly to said recording surface;
projecting a diffraction image produced by the scattering of said laser light in said transmission electron microscope image recorded on said recording surface of said negative film onto a translucent screen;
measuring positions or intensities of diffraction spots of said diffraction image projected; and
performing said measuring at a plurality of irradiating position of said laser light on said recording surface and mapping information obtained from measurement of diffraction spot positions or diffraction spot intensities for each position of laser irradiation.

12. A method of measuring crystal strain as set forth in claim 11, wherein said translucent screen is a plane surface screen.

13. A method of measuring crystal strain as set forth in claim 11, wherein said translucent screen is a semiglobular screen.

14. A method of measuring crystal strain as set forth in claim 11, wherein said translucent screen is a semiglobular screen whose center is located on the optical axis of said laser light irradiated perpendicularly onto said recording surface of said negative film.

15. A method of measuring crystal strain as set forth in claim 14, further comprising: calculating a spacing of crystal lattice planes based on coordinates of positions of said diffraction spots in a coordinate system in which said center of said semiglobular screen is determined as the origin, and, in said mapping, the spacing of crystal lattice planes for each irradiation position being mapped.

16. A method of measuring crystal strain as set forth in claim 14, further comprising: calculating a direction of crystal lattice planes based on coordinates of positions of diffraction spots in a coordinate system in which said center of said semiglobular screen is determined as the origin, and, in said mapping, the direction of crystal lattice planes for each irradiation position being mapped.

17. A method of measuring crystal strain as set forth in claim 14, further comprising: using a coordinate system in which the center of said semiglobular screen is determined as the origin; in that coordinate system, representing coordinates of two diffraction points which do not exist on the same straight line passing through the origin as follows $$(k_{1x}, k_{1y}) \text{ and } (k_{2x}, k_{2y}); \qquad \text{[Formula 6]}$$

in this condition, lattice vectors of real space, i.e., $$(r_{1x}, r_{1y}) \text{ and } (r_{2x}, r_{2y}) \qquad \text{[Formula 7]}$$

being obtained by the following formulas $$r_{1x} = \frac{k_{2y}}{k_{1x}k_{2y} - k_{1y}k_{2x}}, r_{1y} = -\frac{k_{2x}}{k_{1x}k_{2y} - k_{1y}k_{2x}} \qquad \text{[Formula 8]}$$

$$r_{2x} = -\frac{k_{1y}}{k_{1x}k_{2y} - k_{1y}k_{2x}}, r_{2y} = \frac{k_{1x}}{k_{1x}k_{2y} - k_{1y}k_{2x}}$$

from lattice vectors obtained as above and average values of these lattice vectors throughout the transmission electron microscope image recorded on said negative film, i.e., $$(r^0_{1x}, r^0_{1y}) \text{ and } (r^0_{2x}, r^0_{2y}), \qquad \text{[Formula 9]}$$

a deformation matrix is obtained by the following formula $$\begin{pmatrix} 1+\varepsilon_{xx} & \varepsilon_{xy} \\ \varepsilon_{yx} & 1+\varepsilon_{yy} \end{pmatrix} = \begin{pmatrix} r^0_{1x} & r^0_{1y} \\ r^0_{2x} & r^0_{2y} \end{pmatrix}^{-1} \begin{pmatrix} r_{1x} & r_{1y} \\ r_{2x} & r_{2y} \end{pmatrix} \qquad \text{[Formula 10]}$$

wherein, in said mapping, information obtained from said deformation matrix for each irradiation position being mapped.

* * * * *